Aug. 16, 1938.   H. A. TOULMIN, JR   2,127,193
APPARATUS FOR PRODUCTION OF CARBON BLACK
Original Filed Jan. 11, 1935
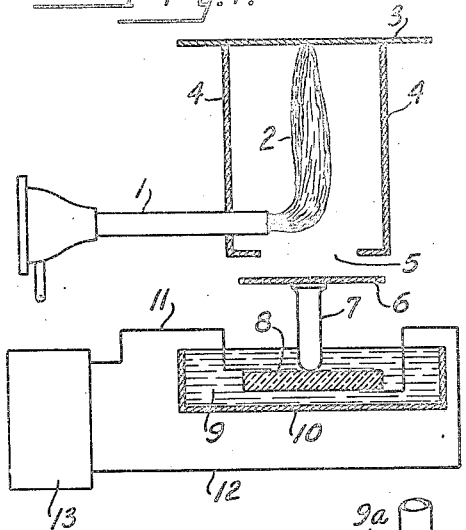
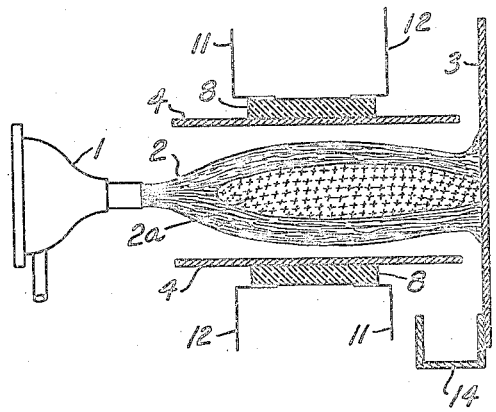
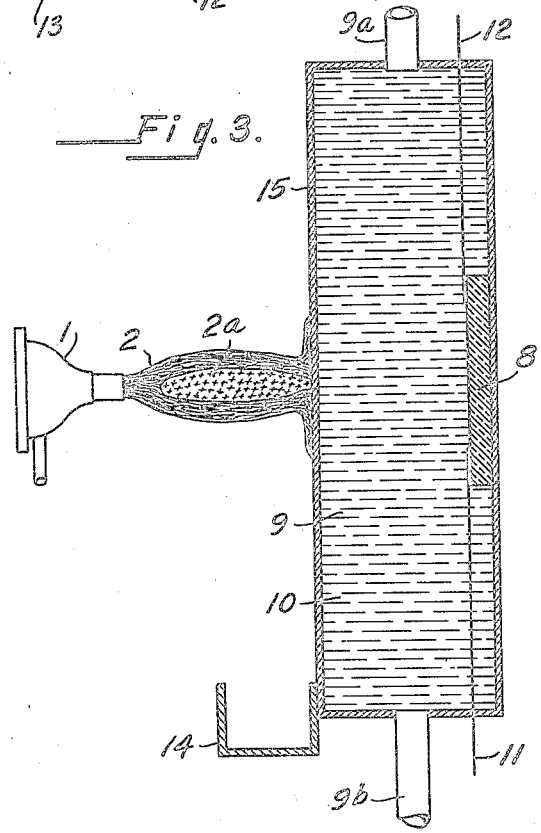
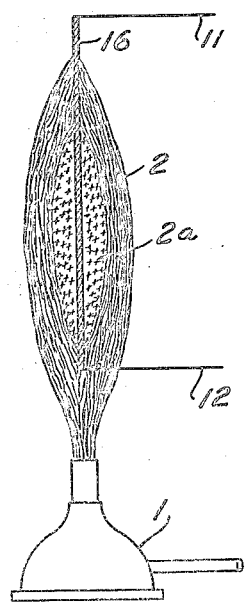
INVENTOR
HARRY A. TOULMIN, JR.
BY Toulmin & Toulmin
ATTORNEYS

Patented Aug. 16, 1938

2,127,193

UNITED STATES PATENT OFFICE 2,127,193

APPARATUS FOR PRODUCTION OF CARBON BLACK

Harry A. Toulmin, Jr., Dayton, Ohio, assignor, by mesne assignments, to Commonwealth Engineering Corporation, Wilmington, Del., a corporation of Delaware Original application January 11, 1935, Serial No. 1,353. Divided and this application February 19, 1936, Serial No. 64,650

12 Claims. (Cl. 134—60)

This invention relates to an apparatus for the production of carbon black.

It is the object of the invention to increase the production of carbon black, and to improve the quality of carbon black.

It is an object to provide for the removal of the carbon from the gas flame, and for removing the carbon as deposited on the collector plate from the vicinity of the gas flame, to thereby increase the quantity of carbon black and improve its quality.

In particular, it is the object of the invention to effect this removal by vibration of the flame, of the air in which the flame is located, and the plate on which the carbon black is collected. Any one or more of such media can be so vibrated.

It is the object of this invention to provide a very high rate of vibration, preferably, and vibrations of very short wave length.

It is an object to provide sonic vibrations for this purpose. I have found that, in particular, sonic vibrations of the wave length of 300 mu. materially increase the deposition of carbon from a gas flame. I particularly find useful supersonic waves of high intensity for this purpose.

This application is a division of my application Serial No. 1,353, filed January 11, 1935, now Patent No. 2,087,391, issued July 20, 1937.

Referring to the drawing:

Figure 1 is a diagrammatic view in vertical section of the apparatus employed, in which the air has imparted to it sonic vibrations.

Figure 2 is a vertical section through a modified form of applying sonic waves to the air confined in the area of the gas flame.

Figure 3 illustrates a vertical section through a form in which the sonic vibrations are directly applied to the plate on which the carbon black is collected.

Figure 4 is a vertical section through a modification showing the arrangement of the collector plate in the flame, bisecting the flame.

Referring to the drawing in detail, I designates a source of gas supply having a flame 2, which impinges upon a collector plate 3, and which is inclosed within the walls 4. The bottom of the box formed by the walls 4 and plate 3 is provided with an opening 5 for receiving the vibrations from the sonic vibrator plate 6 mounted on the glass tube 7. This tube is mounted upon the quartz crystal sonic vibrator 8, which is immersed in an oil bath 9 in the container 10. The wires 11 and 12 lead from sonic vibration apparatus, designated 13. Such an apparatus may be of any desired character, but I have found that set forth and described in the patent of Alfred L. Loomis and Robert Williams Wood, No. 1,734,975, of November 12, 1929 satisfactory.

I have found that by producing in any manner compression waves of high frequency and applying such waves to the gas flame, the air surrounding the gas flame or the collector plate will materially improve the production of carbon black. This is apparently due to the fact that the carbon black is removed rapidly from the combustion zone of the flame to a point where it will not be affected by the flame, and therefore the high loss, either in the flame or due to the impingement of the flame on carbon black deposited on the collector plate, is eliminated.

The essence of my method is the formation of free carbon in the flame by combustion of the gas in the presence of another gas, and the rapid mechanical extraction from the zone of the flame where it will be combustible into the zone of the other gas, where it is not combustible, thereby preserving the integrity of the deposit.

It is obvious that this invention is applicable to other uses than that of removing carbon black from a flame, and is adaptable to the use of causing the deposit of material in one gas stream into another gas stream, or into some other place of collection.

Referring to Figure 2, it will be noted that the sonic vibrators 8 are applied on the side walls 4. By a careful adjustment of the rate of vibration of these sonic vibrators, either in synchronism with one another or out of synchronism with one another, and the adjustment of the size of the flame and the amount of the air admitted to the presence of the flame, the carbon black can be controlled as to its quantity and quality. In this form the carbon black impinging upon the collector plate, which in this instance is the plate 3, is collected in the trough 14.

Turning to Figure 3, there will be seen in this form the use of the sonic vibrator and the liquid as the direct support for the collector plate, and therefore the sonic vibrations are applied directly to the collector plate, designated in this view 15. The flame 2 having the carbon area 2a impinges upon the plate 15, which is mounted over the oil bath 9, that is set in motion by the sonic vibrator 8. If desired, this oil 9 may be circulated through the pipes 9a and 9b in order to maintain the temperature of the plate 15 at the desired point. The carbon black is deposited in the trough 14, due to the vibrations which cause it to collect not only on the plate 15 but also to descend into the trough 14.

The form shown in Figure 3 is, of course, associated with an inclosure to regulate the amount of air admitted to the flame in order to get the usual conditions for the production of carbon black.

In Figure 4 a sonic vibrator plate 16 is shown suspended in the flame bisecting the carbon area 2a. This is another form that is advantageous under certain conditions, particularly where there is a plurality of flames burning in a single inclosure.

In the practice of this invention the quantity and the quality of the carbon black can be controlled by the rate of vibration, the location of the vibration means, the control of the size of the gas flame, the amount of air admitted to the chamber in which the flame is located, and the location of the source of supersonic vibrations with respect to the collector plate, the flame and the gas in which the flame is burning. I have found that supersonic acoustic waves increase the production of carbon black.

I desire to comprehend within my invention such modifications as may be embraced within my claims and the scope of my invention.

Having thus fully described my invention, what I claim as new and desire to secure by Letters Patent, is:

1. In an apparatus for producing carbon black, a container having a burner means for producing a gas flame, a collector plate for collecting carbon black from the gas flame, and means for imparting supersonic mechanical waves to the gaseous contents of the container and the flame.

2. In an apparatus for producing carbon black, means for producing a gaseous carbon flame in a controlled atmospheric inclosure, a collector plate, and means for imparting to the collector plate mechanical compression waves of high frequency, which are substantially inaudible.

3. In combination, burner means for producing a gas flame containing carbon black particles, a collector plate for recovering said carbon black particles, and vibration means for imparting substantially inaudible high frequency mechanical compression waves to the area in which the flame is burning.

4. In an apparatus for producing carbon black, a container, burner means for producing a gas flame within the container, means for restricting the air in the container in its movement around the gas flame, and means for imparting supersonic mechanical compression waves to the gas flame and the air surrounding it.

5. In an apparatus for producing carbon black, a container, burner means for producing a gas flame within the container, means for restricting the air in the container in its movement around the gas flame, means for imparting supersonic mechanical compression waves to the gas flame and the air surrounding it, and means for vibrating the walls of the container to produce the supersonic waves in the gaseous contents of the container.

6. In an apparatus for producing carbon black, a container, means for producing a gas flame within the container, means for restricting the air in the container in its movement around the gas flame, means for imparting supersonic mechanical compression waves to the gas flame and the air surrounding it, means for vibrating the walls of the container to produce the supersonic waves in the gaseous contents of the container, and electrical means for producing the vibrations of the walls of the container.

7. In an apparatus for producing carbon black, burner means for producing a gas flame containing carbon black particles, a plate interposed in said flame, and means of mechanically vibrating said plate to produce supersonic waves to cause such a vibration in the flame as to mechanically shake out of the flame the carbon black produced thereby.

8. In an apparatus for producing carbon black, burner means for producing a flame comprising particles of carbon black, means containing air surrounding said flame, and means of mechanically vibrating said container and the gaseous contents thereof, said means comprising a supersonic electrically actuated vibrator and a liquid medium interposed between said vibrator and said containing means.

9. In an apparatus for producing carbon black, burner means for producing a gas flame, a plate associated therewith adapted to cause said flame to vibrate, a body of liquid in vibration-transmitting relationship with said plate, and an electrically actuated supersonic crystal mechanical vibrator immersed in said liquid whereby the plate and gaseous flame are mechanically vibrated and carbon black produced by the flame is deposited therefrom.

10. In an apparatus for producing carbon black, burner means for producing a gas flame, a plate associated therewith adapted to cause said flame to vibrate, a body of liquid in vibration-transmitting relationship with said plate, an electrically actuated supersonic crystal mechanical vibrator immersed in said liquid whereby the plate and gaseous flame are mechanically vibrated and carbon black produced by the flame is deposited therefrom, and means for circulating said liquid so as to regulate the temperature thereof.

11. In an apparatus for manufacturing carbon black, burner means for producing a carbon black emitting gas flame, a member having a flame-contacting surface means of confining a body of air around said flame, and means for imparting supersonic mechanical vibration waves to said flame and the body of gas surrounding it comprising an electrically actuated supersonic mechanical vibrator and an interposed body of liquid in vibration-transmitting relationship with said member and adapted to transmit the electrical vibrations into mechanical vibrations for actuating the flame and the body of gas surrounding it.

12. In an apparatus for producing carbon black, burner means for producing a carbon black-emitting gas flame, plates on either side of said flame, and means for producing supersonic mechanical vibrations on said plates whereby the air surrounding the flame and the flame will be vibrated to cause the deposition from the flame of carbon black.

HARRY A. TOULMIN, Jr.